April 9, 1935.  A. M. DONOVAN  1,997,050
LOCKING DEVICE FOR THE IGNITION CIRCUIT OF MOTOR CARS OR THE LIKE
Filed March 24, 1932   2 Sheets-Sheet 1

ALFRED MORGAN DONOVAN
INVENTOR

BY Haseltine, Lake & Co.
ATTORNEYS

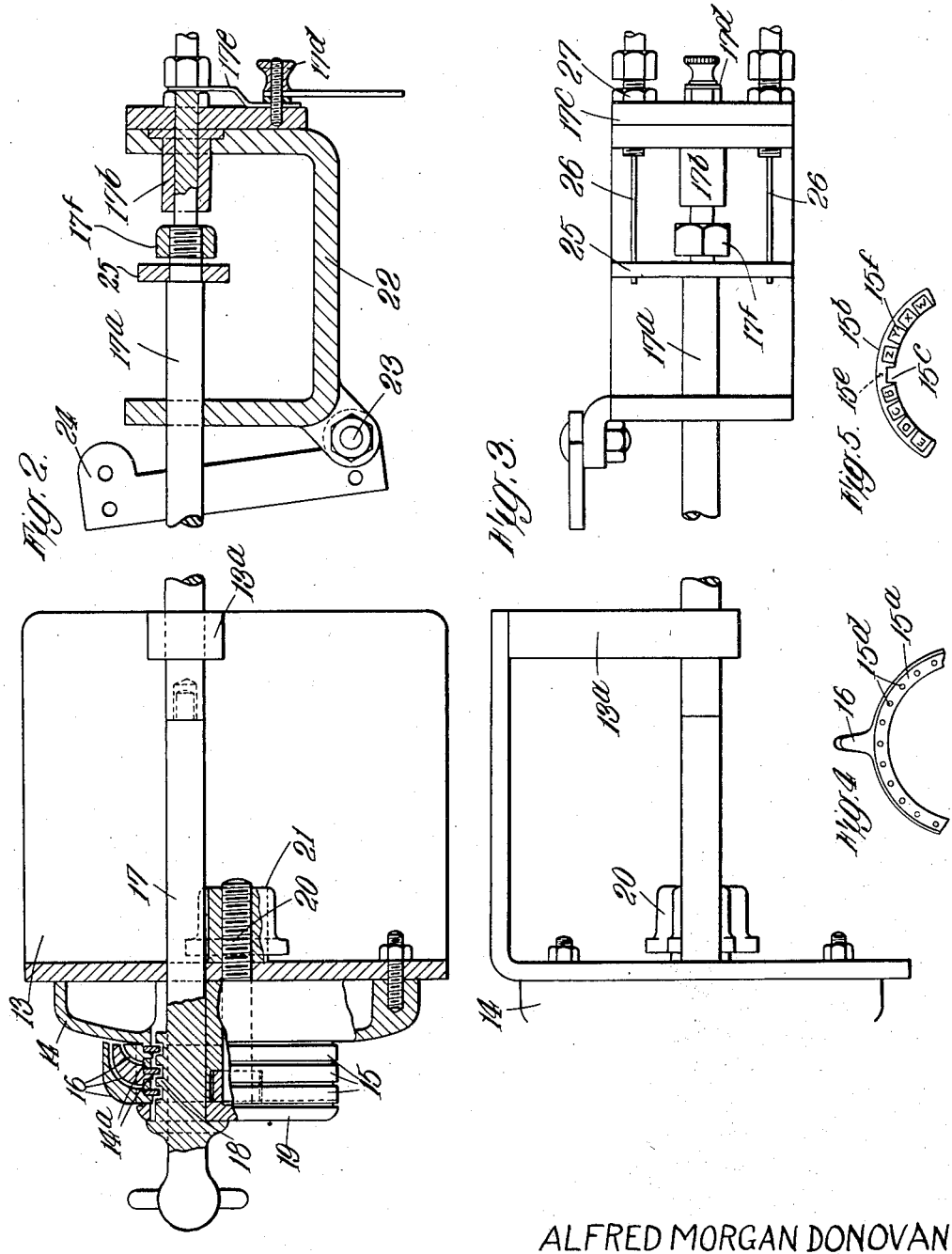

Patented Apr. 9, 1935

1,997,050

UNITED STATES PATENT OFFICE 1,997,050

LOCKING DEVICE FOR THE IGNITION CIRCUIT OF MOTOR CARS OR THE LIKE

Alfred Morgan Donovan, Barking, England

Application March 24, 1932, Serial No. 600,922
In Great Britain September 7, 1931

8 Claims. (Cl. 180—22)

This invention relates to locking devices for the ignition circuits or for the bonnets or doors or other parts of motor vehicles or the like.

It is the chief object of the invention to provide an improved locking device for use on motor vehicles or the like with a view to locking or maintaining the ignition circuit inoperative to prevent unauthorized starting of the vehicle or unauthorized access to the ignition circuit by opening the bonnet or unauthorized access to any other part of the vehicle to which the invention is applied.

Another object of the invention is to provide locking mechanism particularly for motor vehicles comprising in combination a permutation lock having a drawbolt, a number of locking rings surrounding said drawbolt and co-operating therewith to lock the said drawbolt in position, means associated with said drawbolt for rendering an ignition circuit inoperative when the drawbolt is in locked position and other means associated with said drawbolt for locking movable parts of a vehicle in position. The draw-bolt may be provided with an extension which may be so arranged as to open or close or earth the ignition circuit of the vehicle.

The construction of the permutation lock is preferably such that the combination can readily be changed and to enable this to be done each ring is preferably formed in two parts comprising an outer ring and an inner ring separable therefrom, the inner ring being removable when the rings are removed from the body of the lock to enable the combination to be changed. It is also preferred to provide the rings with means for preventing the combination being determined by pulling on the draw-bolt and rotating the rings and "feeling" the operative position of each ring. Means are also preferably provided for permitting the combination of the lock to be altered only after the lock has been set to enable the draw-bolt to be withdrawn. The draw-bolt may also be so constructed as to enable it to be placed into locking position without the necessity of setting the combination.

In order that the said invention may be clearly understood and readily carried into effect, the same will now be more fully described with reference to the accompanying drawings which illustrate by way of example the invention as applied to a combined ignition lock and bonnet lock: in the drawings:—

Figure 2 is a side elevation partly in section of the permutation lock together with means for locking or rendering the ignition circuit inoperative;

Figure 3 is a partial plan view of Figure 2;

Figure 4 is a partial view illustrating the outer ring of the permutation lock;

Figure 5 is a partial view illustrating the inner ring of the permutation lock;

Figure 1:
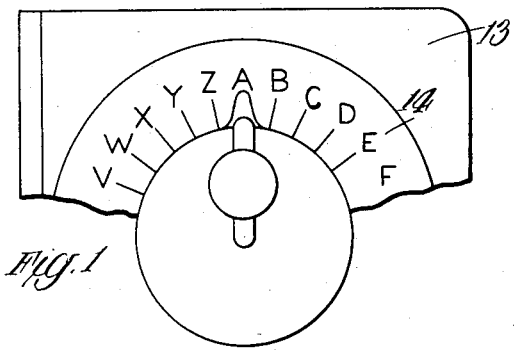
Figure 1 is a partial front elevation of the permutation lock employed in the invention.

Referring now more particularly to Figures 1, 2 and 3 of the accompanying drawings, the reference numeral 13 indicates a bracket which can be mounted upon the steering column bracket of a motor vehicle and to which the permutation lock is secured. The bracket 13 is preferably made adjustable or provided with adjustable mounting means so that the inclination of the lock may be varied to suit the inclination of the steering column to which the device is applied although it will be appreciated that the device may be applied to any other part instead of the steering column. The permutation lock shown comprises a back plate 14 bolted to the bracket 13 and a plurality of locking rings 15 which can be rotated relatively to stationary rings 14ᵃ. The back plate 14 has stamped thereon or is otherwise provided with the letters of the alphabet as shown in Figure 1. Each ring 15 in the construction shown is provided with a pointer 16 through the medium of which the rings 15 can be rotated to set them to the appropriate combination. The rings 15 co-operate with a draw-bolt 17 having teeth or serrations 18. The rings 15 are held in position upon a central boss of the back plate 14 by a face plate 19 having a bolt 20 which projects through the central boss to the rear of the back plate 14 as shown in Figure 2. In order to prevent the face plate 19 being removed unless the combination is set, there is provided on the bolt 20 a nut 21 the periphery of which is grooved or serrated in such a manner that the draw-bolt 17 can be embraced between the walls of each groove or serration. In the position shown the nut 21 cannot be rotated to allow the plate 19 to be removed unless the draw-bolt 17 is previously removed from the lock.

Instead of employing a grooved or serrated nut for preventing the face plate 19 from being removed any other means may be used.

Figure 6:
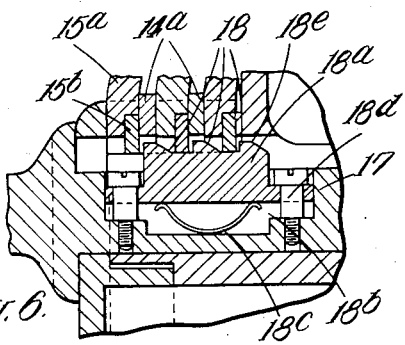
Figure 6 is an enlarged partial cross section of a modified construction of draw-bolt.

Each ring 15 comprises an outer ring 15a (Figure 4) and an inner ring 15b (Figure 5). The outer rings 15a carry the pointers 16 and are recessed as shown in Figures 2 and 6 which recesses accommodate the inner rings 15b. The inner rings 15b project beyond the outer rings 15a as shown in Figures 2 and 6 and are each provided with a slot 15c. When the slots 15c in the rings are in alignment the draw-bolt can be withdrawn and likewise when the slots are not in alignment the draw-bolt when in the position shown in Figure 2 is locked. Each outer ring 15a has a series of equidistant circumferentially arranged apertures 15d and each inner ring 15b is provided with a pin 15e on the reverse side of the ring shown in Figure 5, which can be received in any one of the apertures 15d in the outer rings 15a. The inner ring 15b has stamped or otherwise provided on its circumference the letters of the alphabet as shown which are arranged in recesses or depressions 15f the purpose of which will be hereinafter referred to. If it be desired to change an existing combination the face plate 19 is removed after the draw-bolt 17 has been withdrawn and the rings 15 and the stationary rings 14a removed from the boss on the back plate 14. The outer rings 15a and the inner rings 15b can then be separated from one another. The inner rings 15b are then arranged in the outer rings with the appropriate letter of the combination located opposite the pointer 16; thus when the rings are re-assembled upon the said boss the rings, in order to bring the slots 15c into alignment are rotated so that the pointers 16 are located opposite the letter on the back plate 14, corresponding to the letter on the inner ring 15b that is opposite the pointer 16. The provision of the recesses or depressions 15f prevents the combination being determined by pulling the draw-bolt 17 and rotating each ring in turn and feeling when the slot 15c in each inner ring passes the teeth or serrations 18. If the draw-bolt 17 is pulled the teeth or serrations 18 will enter the recesses 15f opposite the teeth and thereby prevent the rings from being rotated.

Instead of employing a back plate 14 with the letters of the alphabet stamped thereon the rings 15 may be constructed with the letters of the alphabet arranged on their periphery the rings in this case being flat or of conical form.

In the construction of lock shown in Figure 2 it is necessary to set the combination both when it is desired to withdraw the draw-bolt 17 and when it is desired to move the draw-bolt to the locked position.

Figure 7:
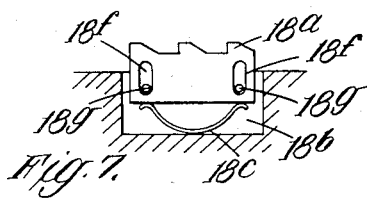
Figure 7 is a modification of the mechanism illustrated in Figure 6.

In Figures 6 and 7 a modified construction is shown in which the draw-bolt is so constructed as to enable it to be moved into the locked position without the necessity of setting the combination. In this construction the teeth or serrations 18 are capable of displacement when the draw-bolt is pushed into locking position but prevent the draw-bolt from being withdrawn unless the combination is set. The teeth or serrations 18 are formed upon a downwardly displaceable member 18a which is mounted in a slot 18b in the draw-bolt and is normally urged upwardly by means of a leaf spring 18c. The toothed member 18a is held in position by means of screws 18d and the edges of the teeth 18 are inclined at 18e as shown to enable the toothed member 18a to be depressed when the draw-bolt 17 is pushed into locking position. When in locking position the spring 18c forces the member 18a upwardly so that the draw-bolt cannot be withdrawn until the combination is set. In the modifications shown in Figure 7 the member 18a is provided with slots 18f that co-operate with pins 18g which maintain the member 18a in the slot 18b.

The draw-bolt 17 is provided with an extention 17a (see Figures 2 and 3) screw threaded thereto which extension is guided in a lug 13a projecting from the bracket 13, the extension passing through one limb of another bracket 22 which is adapted to be mounted in any suitable manner inside the bonnet of the vehicle. As shown the bracket 22 is pivotally mounted by a bolt 23 to another bracket or attachment member 24 which is secured to a convenient part of the vehicle for example to the underside of the scuttle or foot board. The bracket 22 is pivotally mounted so as to enable the bracket to be inclined to suit the inclination of the bracket 13 which as aforesaid may be secured to the steering column of the vehicle.

The draw-bolt extension projects through a bush 17b mounted in another limb of the bracket 22 which limb is provided with an insulating block 17c. The insulating block carries a terminal 17d having a contact finger 17e. The terminal 17d is connected to the magneto or other ignition device of the vehicle (for example the battery of a coil ignition system) and when the draw-bolt 17 and the extension 17a are in the position shown the extension 17a makes contact with the finger 17e and earths or short circuits or otherwise renders inoperative the ignition device. When, however, the draw-bolt 17 is withdrawn the extension 17a is moved out of contact with the finger 17e to permit the ignition device to function.

Instead of earthing or short circuiting the ignition device as aforesaid the extension 17a may be arranged to operate make and break contacts in the ignition circuit.

In Figures 2 and 3 the ignition locking mechanism is shown as combined with means for locking the bonnet of the vehicle for the purpose of preventing unauthorized use of the vehicle by opening the bonnet and breaking the connection to the terminal 17d. As shown the extension 17a is provided with a cross piece 25 which is connected to Bowden wires 26 having adjustable nipples 27. The Bowden wires serve to operate any suitable form of mechanism for locking the movable parts or flaps of the bonnet of one or both sides of the vehicle.

Figure 8:
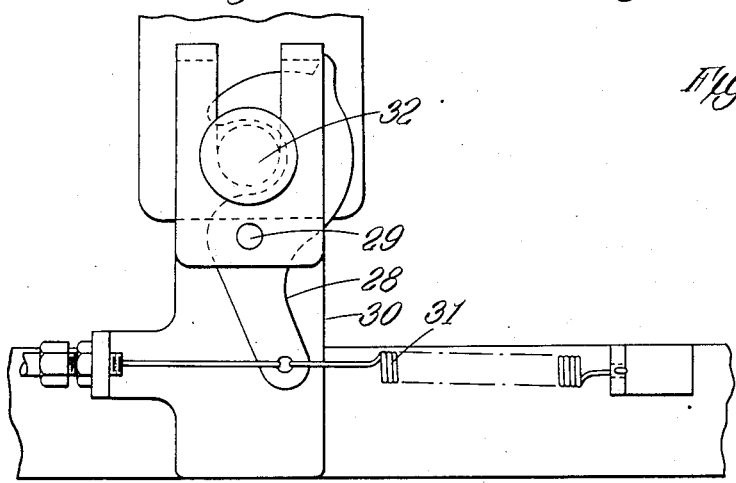
Figure 8 is a side elevation of mechanism for locking the bonnet.
Figure 9:
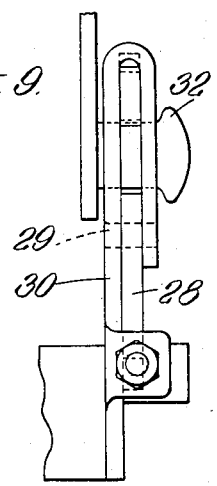
Figure 9 is an end elevation of Figure 8.

Figures 8 and 9 illustrate one form of bonnet locking mechanism which comprises a catch 28 pivoted at 29 between the bent over end of a vertical arm or bracket 30. The catch 28 is of hook shape as shown and is normally urged into the closed position shown by means of a spring 31. The catch 28 co-operates with a pin or stud 32 provided on the interior surface of the movable flap of the bonnet which pin or stud 32 is adapted to pass between the bifurcated end of the vertical arm or bracket 30 to co-operate with the hooked portion of the catch 28. The end (or ends) of the Bowden wire (or wires) remote from the cross piece 25 is connected to the catch 28 so that when the draw-bolt 17 is withdrawn the catch 28 is moved against the tension of the spring 31 to draw the pin or stud 32 out of the bifurcated end of the arm 30. The preferred arrangement is such that the initial withdrawal movement of the draw-bolt 17 to render the ignition circuit operative does not move the catch 28 into a position in which the bonnet can be opened the movement of the catch into this position only being effected when the draw-bolt 17 is withdrawn to a position beyond the position in which the ignition circuit is initially rendered operative due for example, to the provision of a lost motion connection. The lost motion connection is shown in Figures 2 and 3 in which it will be observed that the cross piece 25 is loosely mounted on the drawbolt extension 17ª in such manner that when the drawbolt 17 is initially moved outwardly when the permutation lock is unlocked the cross piece 25 remains stationary so that the switch device is first operated and the bonnet locks remain in the locked position. Upon a further movement being imparted to the drawbolt the nut 17ᶠ engages the said cross piece 25 and causes the latter to be moved to operate the bonnet catches. The upper portion of the hooked end of the catch 28 in the embodiment shown is curved so as to enable the movable flap of the bonnet to be moved into the locked position without the necessity of withdrawing the drawbolt.

Figure 10:
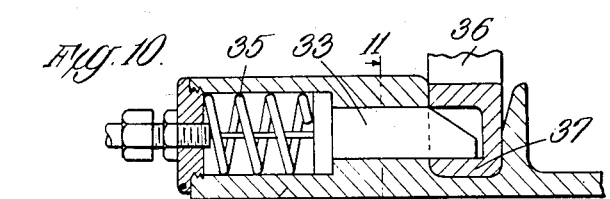
Figure 10 is a cross sectional view of another form of bonnet locking mechanism.
Figure 11:
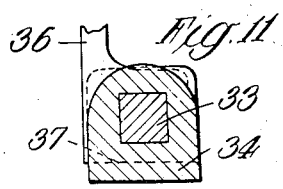
Figure 11 is a cross sectional view taken along the line 11—11 of Figure 10.
Figure 12:
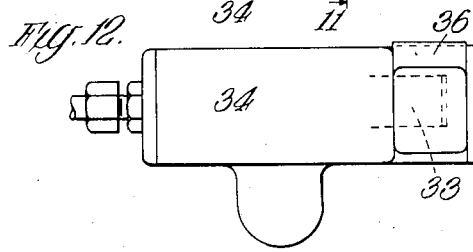
Figure 12 is a plan view of Figure 10.

Figures 10, 11 and 12 illustrate a further construction of bonnet locking mechanism in which the end of the Bowden wire is connected to a plunger 33 mounted in a casing 34 and normally urged into the position shown in Figure 10 by means of a spring 35. The movable flap of the bonnet is provided with a co-operating locking element 36 the lower end of which has a laterally extending lug 37 which when in the locked position shown in Figure 10 is adapted to lie beneath the plunger 33. The upper surface of the plunger 33 is inclined as shown to permit the movable flap of the bonnet to be moved into the locked position without the necessity of operating the draw-bolt 17 to withdraw the plunger 33.

The mechanism described for locking the movable parts or flaps of the bonnet in position may be employed for locking other parts of the vehicle for example the rear doors of a van.

What I claim and desire to secure by Letters Patent of the United States is:—

1. In a motor vehicle including a bonnet having a movable flap and an ignition device, a permutation lock having a drawbolt mounted for longitudinal movement, the latter or an extension thereof passing within the bonnet of the vehicle where it is associated with a switch device for rendering the ignition inoperative when the said drawbolt is in locked position, a catch connected to the said drawbolt or to the extension thereof for locking the bonnet, means normally urging said catch into a position to lock said bonnet, the said catch being adapted to be moved to unlock the said bonnet after the drawbolt has been unlocked and moved beyond the position in which the said ignition circuit is rendered operative, the locking mechanism being actuated upon a longitudinal movement being imparted to the said drawbolt.

2. Locking mechanism particularly for motor vehicles comprising, a permutation lock having a drawbolt mounted for longitudinal movement, the drawbolt or an extension thereof being provided with a contact member associated with a switch for rendering an ignition circuit inoperative when the drawbolt is in locked position, a catch connected to the said drawbolt or to the extension thereof for locking a bonnet, means normally urging the said catch into locking position, the said catch being adapted to be moved to unlocking position after the drawbolt has been unlocked and moved beyond the position in which the ignition circuit is rendered operative, the locking mechanism being actuated upon a longitudinal movement being imparted to the said drawbolt.

3. In a motor vehicle including a bonnet having a movable flap and an ignition device, a permutation lock having a drawbolt, the latter or an extension thereof passing within the bonnet of the vehicle where it is associated with a switch device for rendering the ignition circuit inoperative when the drawbolt is in locked position, a catch connected to the said drawbolt or to the extension thereof for locking the bonnet, means normally urging said catch into a position to lock the said bonnet, the said catch being adapted to be moved to unlock the said bonnet after the said drawbolt has been unlocked, the shape of the catch being such as to enable the bonnet to be moved into the locked position without the necessity of moving the said catch to the unlocked position.

4. Locking mechanism particularly for motor vehicles comprising in combination a permutation lock having a drawbolt mounted for longitudinal movement and provided with a contact member associated with a switch device, a transverse member on said drawbolt, a lost motion connection between said transverse member and said drawbolt, the said transverse member being connected to a catch for locking movable parts of a vehicle in position, the said switch device and the catch being operated upon a longitudinal movement being imparted to the said drawbolt, the lost motion connection enabling the drawbolt to operate the switch device without operating the said catch until the drawbolt is moved beyond the position in which the said switch device is operated.

5. In a motor vehicle including a bonnet having a movable flap and an ignition device, a permutation lock having a drawbolt, a switch device associated with a contact member on said drawbolt for rendering the ignition circuit inoperative when the said drawbolt is in locked position, a transverse member on said drawbolt, a lost motion connection between said drawbolt and said transverse member, the latter being connected to at least one catch associated with said movable flap for locking the said flap in position, the said switch device and the said catch being operated upon a longitudinal movement being imparted to said drawbolt, the lost motion connection enabling the drawbolt to operate the switch device without operating the said catch until the drawbolt is moved beyond the position in which the said switch device is operated.

6. Locking mechanism as in claim 5, wherein the said catch comprises a member normally urged into locking position, one surface of the said catch being shaped so as to permit a co-operating member on the said bonnet to be moved into the locked position without the necessity of moving the said catch into the unlocked position.

7. Locking mechanism as in claim 2, wherein the said catch is pivotally mounted.

8. Locking mechanism as in claim 3, wherein the said catch is pivotally mounted.

ALFRED MORGAN DONOVAN.